United States Patent [19]

Smith

[11] Patent Number: 4,541,609

[45] Date of Patent: * Sep. 17, 1985

[54] DISCONNECTABLE VALVE MOTOR DRIVE

[75] Inventor: Glen H. Smith, Algona, Wash.

[73] Assignee: Consolidated Controls Corporation, El Segundo, Calif.

[ * ] Notice: The portion of the term of this patent subsequent to Mar. 13, 2001 has been disclaimed.

[21] Appl. No.: 581,338

[22] Filed: Feb. 17, 1984

Related U.S. Application Data

[63] Continuation of Ser. No. 275,340, Jun. 19, 1981, Pat. No. 4,436,278, which is a continuation of Ser. No. 128,958, Mar. 10, 1980, abandoned.

[51] Int. Cl.4 .......................... F16K 31/05; F16D 1/00
[52] U.S. Cl. ........................... 251/129.03; 251/129.11; 74/625; 74/424.8 VA; 74/89.15; 403/46; 403/320; 411/140; 192/67 P
[58] Field of Search .......................... 251/130, 133, 14; 74/625, 424.8 VA, 89.15; 403/46, 1, 320; 192/67 P; 411/140

[56] References Cited

U.S. PATENT DOCUMENTS

| 2,693,718 | 11/1954 | Gericke | 74/625 |
| 2,933,937 | 4/1960 | Kron et al. | 251/130 X |
| 3,298,249 | 1/1967 | Nott | 74/625 |
| 3,351,364 | 11/1967 | Warn et al. | 403/1 |
| 3,408,035 | 10/1968 | Lathrop, II et al. | 251/130 X |
| 3,505,888 | 4/1970 | Denkowski | 251/133 X |
| 3,515,250 | 6/1970 | Cantalupo | 251/130 X |
| 4,220,313 | 9/1980 | Petersen et al. | 251/130 X |
| 4,273,460 | 6/1981 | Ueno | 403/1 |

FOREIGN PATENT DOCUMENTS 821952 10/1959 United Kingdom ............ 251/130

Primary Examiner—Arnold Rosenthal
Attorney, Agent, or Firm—Seed and Berry

[57] ABSTRACT

A stem nut for driving a valve stem is coaxially rotatable within a drive collar which is offset from the axis of a nutating drive motor. The drive motor and the drive shaft are coupled together for rotation by means of readily interchangeable sprockets driven by a roller chain. The coaxial stem nut and the drive collar are releasably locked together by removable pins. When the pins are removed, the stem nut permits the valve stem to be directly operated with a wrench or the like. The stem nut is readily removable from the offset drive assembly by releasing a snap ring.

17 Claims, 6 Drawing Figures

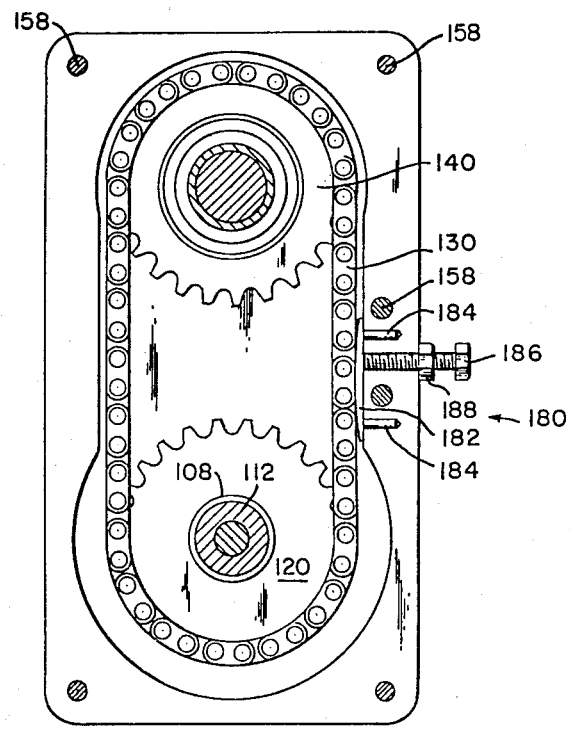
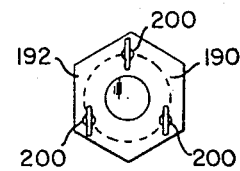
FIG. 6
FIG. 4
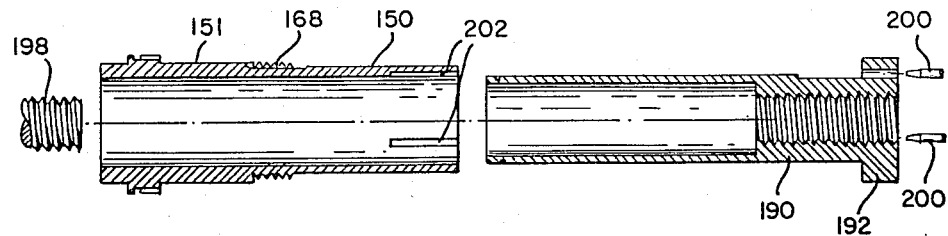
FIG. 5

DISCONNECTABLE VALVE MOTOR DRIVE

This application is a continuation of U.S. patent application Ser. No. 275,340, filed June 19, 1981 now U.S. Pat. No. 4,436,278, which is a continuation of now-abandoned U.S. patent application Ser. No. 128,958, filed Mar. 10, 1980.

BACKGROUND OF THE INVENTION

1. Field of the Invention

This invention relates to drive assemblies for valves and, more particularly, to offset drive assemblies for coupling nutating motors to valve assemblies.

2. Prior Art Relating to the Disclosure

A nutating motor provides low-speed, high torque drive capabilities for driving an operator for fluid control valves and the like. Valves for pipes having diameters of several inches or more weigh from 50 to 500 pounds, and the operators used with such valves weigh over 100 pounds. Access to the valve stem of a valve driven by prior art motor-driven operators is difficult, often requiring the heavy operator to be unbolted and removed. A handwheel is then connected to the valve stem for manually operating the valve. For maintenance this is a time-consuming cumbersome procedure; and for emergency situations, this is an unacceptable procedure. Prior motor driven valve operators are also not readily adaptable to provide different speeds for different applications using a fixed-speed drive assemblies. It is often necessary to provide each valve size with an operator tailored for use with that valve size resulting in large inventories and lack of standardization.

SUMMARY OF THE INVENTION

To overcome these and other deficiencies of the prior art, it is an object of the invention to provide an offset drive assembly which includes removable output drive coupling means permitting easy disengagement from a drive motor so that an operator can directly operate a valve with a wrench or the like It is another object of the invention to provide a nutating motor offset drive assembly which is standardized for use with a variety of valve sizes.

It is another object of the invention to provide an offset drive assembly which permits a variety of speed ratios to be obtained by use of removable sprockets.

It is another object of the invention to provide an offset drive assembly which is easily removed and readily interchangeable with similar assemblies.

In accordance with these and other objects of the invention, a valve offset drive assembly is provided which is easily disengaged from the valve to permit direct operation of the valve. The valve drive assembly is adapted for use with a drive motor which has an output shaft offset from the valve stem. A drive gear sprocket on the motor output shaft drives a roller chain which drives a driven sprocket. The driven sprocket is fixed to a hollow cylindrical collar which is rotatably mounted to the housing. A stem nut is connected to the valve stem and rotates within the hollow center of the collar. The collar and the stem nut are releasably locked together for rotation by means of at least one easily removed coupling pin. The coupling pin fits within a groove formed between the collar and the stem nut. When the pin is removed, the valve stem and the collar rotate independently. The valve is then operable by a separate auxiliary drive means which includes manually oprated means such as a wrench or the like which engages an external nut portion of the stem nut. The stem nut is readily removed from the offset drive assembly by disengaging a removable fastener such as a snap ring. The speed ratio between the drive motor and the valve stem is selectable by changing the ratio between the drive and the driven sprockets.

BRIEF DESCRIPTION OF THE DRAWINGS

FIG. 4 is a sectional view of a roller chain and sprocket gear assembly taken along sectional line 4—4 of FIG. 3;

FIG. 5 is a partially sectional exploded view of a collar and and an interfitting stem nut according to the invention;

FIG. 6 is an end view of a stem nut and pins.

DETAILED DESCRIPTION OF THE PREFERRED EMBODIMENT

Figure 1:
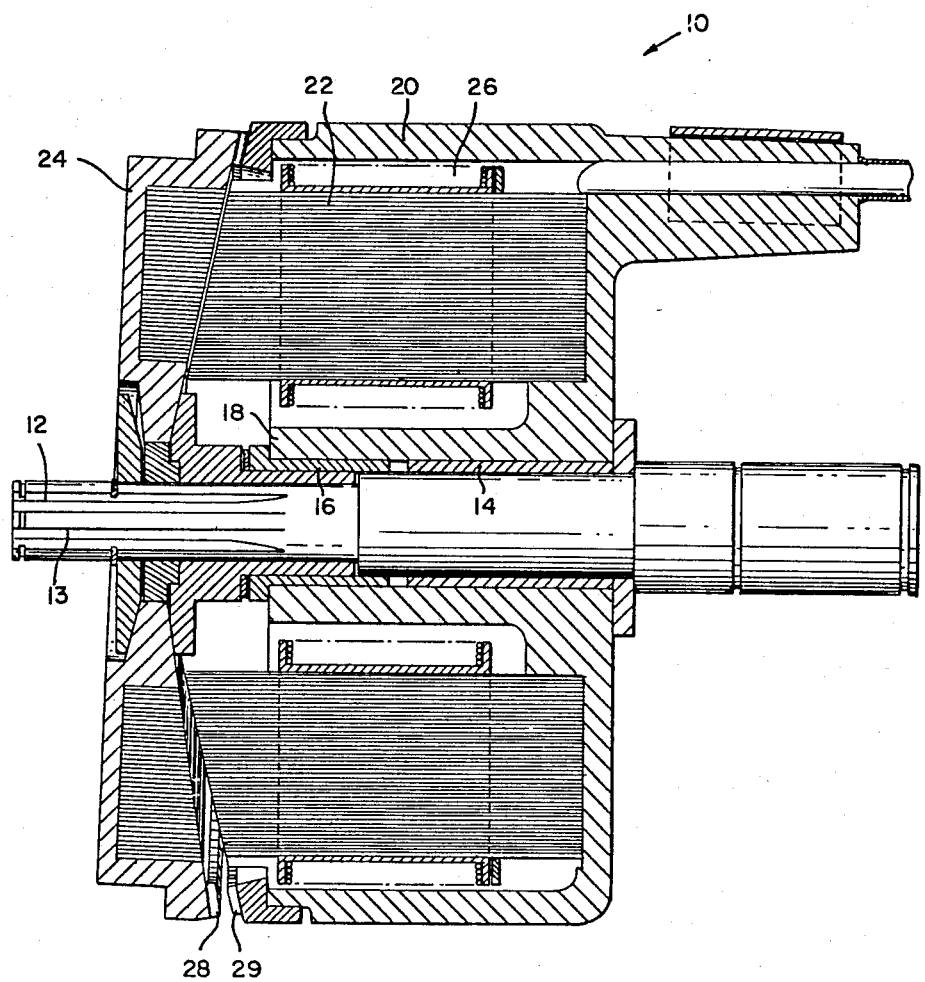
FIG. 1 is a partially sectional view of a nutating motor suitable for driving an offset drive assembly according to the invention.

FIG. 1 shows a nutating motor 10 of the type which provides a high-torque, low-speed output drive to a shaft 12. The shaft 12 is shown having splines for engaging with an output coupling means such as the offset drive assembly according to the instant invention. The shaft 12 is journaled within sleeve bearings 14, 16 contaned within a central cylindrical hollow portion 18 of a motor housing 20. A plurality of pole pieces 22 are radially positioned around the axis of the shaft 12. Each of the pole pieces 22 is energized by means of a coil winding 24. A magnetically permeable rotor, or nutating element, 24 is mounted on the output shaft 12 by suitable coupling means which permits the rotor 24 to wobble about the axis of the output shaft 12 as each of the pole pieces 22 are sequentially energized. Both the rotor 24 and the housing 20 each have ring gears 28, 29 facing each other as shown and the area of contact therebetween rotates as the pole pieces are sequentially energized and various portions of the rotor are drawn toward the pole pieces. If the number of teeth on each gear are different, the rotor 24 moves an angular distance equal to the difference in the number of teeth during each nutation cycle. This permits the nutating, or wobbling, motion of the rotor to be converted to rotary motion of the output shaft. The output shaft 12 thus is able to deliver high torque at relatively low speeds for operating devices such as valves and the like.

Figure 2:
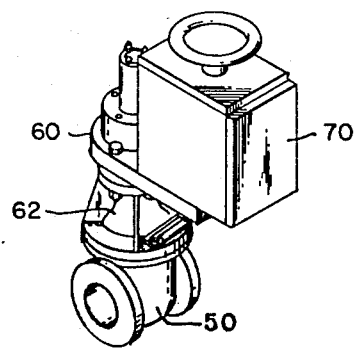
FIG. 2 is an isometric assembled view of a valve assembly, a drive motor assembly and an offset drive assembly according to the invention.

FIG. 2 shows a typical valve assembly 50. The threaded stem 52 of a gate valve 50 is rotated and linearly moved by an offset drive assembly 60, which is mounted to the valve by a yoke 62. A hex nut 64 of provided for manual operation of the valve. The drive assembly 60, as indicated in FIG. 2, is positionable on the yoke in one of four orientations in a horizontal plane which lies perpendicular to the valve stem. A motor assembly 70 drives the offset drive assembly 60. The motor assembly 70 is positionable in one of three orthogonal orientations on the drive assembly 60. The variety of positions for the drive assembly and the motor assembly permits them to be oriented as required for particular installations.

Figure 3:
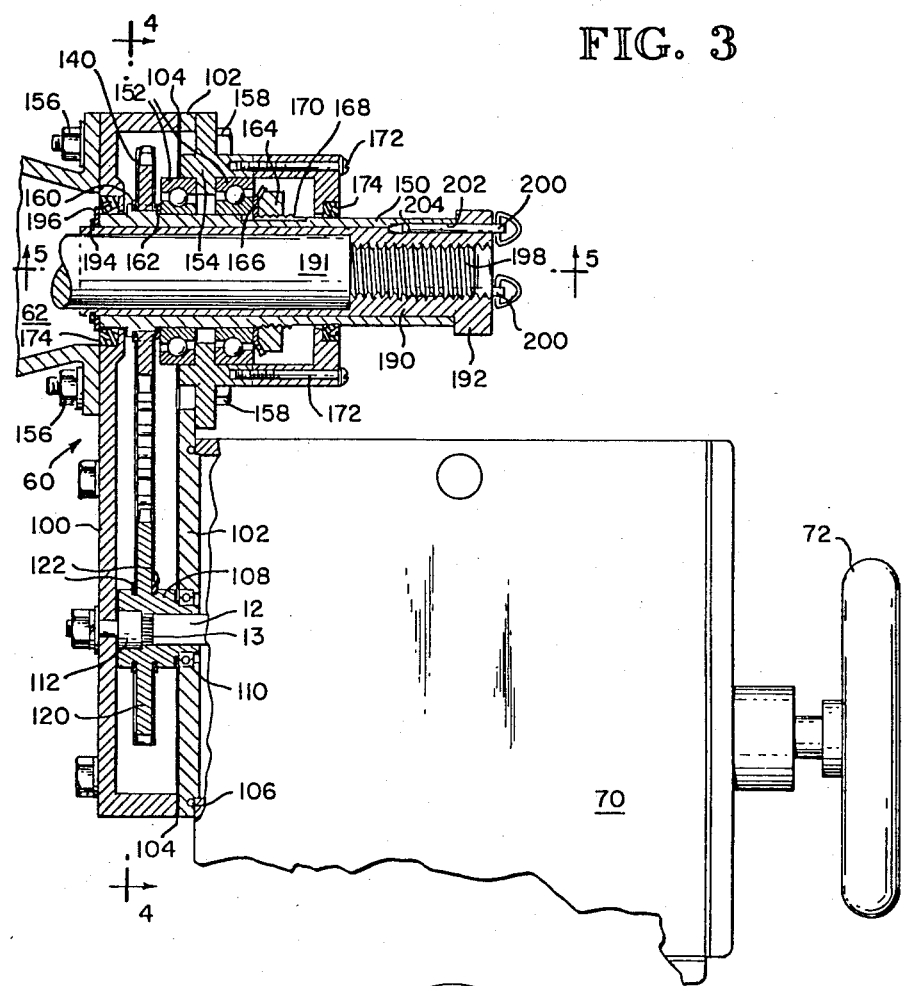
FIG. 3 is a partially sectional view of an offset drive assembly according to the invention.

FIG. 3 shows in more detail the offset drive assembly 60. A housing 100 and a cover 102 are sealed by a gasket 104. The cover 102 includes a groove which contains an O-ring 106 which provides a seal between the drive motor assembly 70 and the cover 102. The motor assembly 70 includes a hand wheel 72 which may be engaged in a conventional manner to manually rotate the motor if required. The output shaft 12 of the motor is connected to a hub 108 by the splines 13. A ball-bearing assembly 110 rotatably supports one end of the hub 108. The other end of the hub 108 is supported by a roller bearing 112.

A drive sprocket 120 is splined to the hub 108 and laterally held in position by means of retaining rings 122 which engage circumferential grooves formed in the hub 108 adjacent each side of the sprocket 120. A roller chain 130 shown in FIG. 4 is operated by the drive sprocket 120. The interior of the housing 100 is filled with suitable oil for lubricating the chain and sprocket assembly.

FIGS. 3 and 4 show a driven sprocket 140 which is operated by the roller chain 130. The driven sprocket 140 is fixed to the exterior of a collar 150 shown in cross-section in FIG. 5 by splines 151. The collar 150 is rotatably supported on the housing by a pair of ball bearing assemblies 152. The bearing assemblies 152 are held by a bearing mounting flange 154 which is bolted to the housing 100 by nuts 156 and bolts 158. The housing 100 is similarly fastened to the yoke 62. A retaining ring 160 is positioned between a radially extending flange portion of the collar 150 and the driven sprocket 140. A washer 162 is positioned between the opposite side of the driven sprocket 140 and the inner race of one of the bearings 152. A depending portion of the flange 154 contacts the outer races of the bearings 152 as shown. The inner race of the second bearing is held by a lock washer 166 and nut 164, which is threaded onto a threaded portion 168 of the collar 150. A cup-shaped cover 170 for the bearings is fastened to the flange 154 by screws 172 and oil seals 174 are provided between the collar 150 and the cover 170.

Rotation of the motor output shaft 12 is coupled through the roller chain and sprockets to the collar 150. The ratio between the drive sprocket 120 and the driven sprocket 140 is variable so that the speed ratio between the motor and the collar can be optimized for a particular application. One or both of the sprockets are replaceable to provide the desired ratio.

An idler block assembly 180 for tensioning the roller chain includes a block 182 which has a surface which rides against the roller chain 130. Guide pins 184 for the idler block 180 slide within appropriate apertures formed in the housing. The location of the block 182 is adjusted by means of a bolt 186 which is threaded into an aperture in the housing and locked by a nut 188.

FIGS. 3 and 5 show a stem nut 190 which rotatably fits within the collar 150 as shown in FIG. 3. The stem nut 190 includes a hexagonally shaped end flange, or integral nut portion 192, at one end. The inside face of the nut 192 stops against one end of the collar 150. A snap ring 194 near the other end of the collar engages a circumferential groove formed at the other end of the stem nut 190. The snap ring 194 holds a thrust washer 196 against the other end of the collar 150 as shown in FIG. 3. The stem nut is thus mounted to rotate within the hollow cylindrical collar 150. A cylindrical aperture formed at the one end of the stem nut 190 has threads formed in the walls adjacent the aperture for engaging the threads 198 on the end of a valve stem 191. As the stem nut 190 is rotated, the valve stem is axially moved to position the gate member of the valve. The valve stem, the stem nut 190 and the collar 150 are aligned on a common axis which is offset from the axis of the motor drive shaft 12. The stem nut 190 is free to rotate within the collar 150 except when pins 200 are inserted in correspondingly aligned grooves 202, 204 formed in the adjacent opposing surfaces of the collar 150 and the stem nut 190. When the coupling pins 200 are inserted in the grooves, the collar 150 and the stem nut 190 are locked together for coaxial rotation.

When the pins 200 are removed, the valve stem is uncoupled from the motor and the valve stem is manually rotatable by means of the integral nut portion 192 of the stem nut 190. The valve stem may thus be independently operated by auxiliary drive means such as, for example, a wrench which engages the hexagonal head 192 of the stem 190. Manual operation is desirable for a variety of reasons including electrical power failure or malfunction of the drive motor 70 and of the offset drive assembly. For operation of a valve by the nutating motor, the pins 200 are inserted in the grooves and the motor is operated with conventional motor controls. If manual operation of the valve is required, the pins 200 are easily removed and a wrench or the like is used to turn the disengaged stem nut 190 to move the the valve stem. Removal of the snap ring 194 permits the stem nut 190 to be separated from the collar 150. Removal of the operator assembly 60 from the valve yoke 62 permits an offset drive assembly to be easily replaced for repair or service. It may also be desirable to have alternative offset drive assemblies available, which assemblies provide speed ratios suited for particular operating conditions.

While a particular embodiment of the invention has been shown and described, it should be understood that the invention is not limited thereto. It is intended to cover by the instant application any modifications which fall within the true spirit and scope of the invention as disclosed and claimed herein.

I claim:

1. A drive assembly for coupling a valve stem to a motor, comprising:
    a drive motor having an output member;
    a valve having a stem with a threaded portion;
    means for driving the stem of the valve from the motor which comprises:
    a collar rotatably coupled to the drive motor output member;
    a stem nut releasably and drivably engaged with the collar and threaded on the threaded portion of the stem, the stem nut and collar being co-axial with one another and substantially axially stationary, the stem nut having a manually engageable portion exteriorly positioned for access from the exterior of the drive assembly for direct rotation of the stem nut upon turning of the engagement portion; and
    a removable locking member releasably locking the stem nut and the collar together in fixed relative relation for coaxial rotation, the locking member being separable from and interconnecting the stem nut and collar and being accessible from the exterior of the drive assembly for rapid and easy release of the collar from driving engagement with the stem nut by removal of the locking member without further disassembly of the drive assembly to allow manual rotation of the stem nut to drive the stem independent of the drive motor.

2. The drive assembly of claim 1 wherein the motor ouput member is a shaft.

3. The drive assembly of claim 2 wherein the motor shaft is offset from the valve stem.

4. The drive assembly of claim 1 wherein the locking member is a coupling pin.

5. The drive assembly of claim 4 wherein the collar coaxially and rotatably receives the stem nut therein.

6. The drive assembly of claim 5, wherein the stem nut has a portion adapted to be engaged by an auxiliary drive means so that when the coupling pin is not inserted, the valve stem rotates free of the collar and is independently operably by the auxiliary drive means.

7. The drive assembly of claim 6, wherein the auxiliary drive means includes manually operated drive means.

8. A drive assembly for coupling a valve stem to a motor, comprising:
   a drive motor having an output member;
   a valve having a stem with a threaded portion;
   means for driving the stem of the valve from the motor which comprises:
   a collar rotatably coupled to the drive motor output member;
   a stem nut releasably and drivably engaged with the collar and threaded on the threaded portion of the stem, the stem nut and collar being co-axial with one another and the collar rotatably receiving the stem nut therein; and
   a removable coupling pin releasably locking the stem nut and the collar together in fixed relative relation for coaxial rotation, the locking member interconnecting the stem nut and collar and being accessible from the exterior of the drive assembly for rapid and easy release of the collar from driving engagement with the stem nut by removal of the locking member without further disassembly of the drive assembly to allow manual rotation of the stem nut to drive the stem independent of the drive motor, said collar and said stem nut corresponding grooves formed in adjacent surfaces thereof for receiving said coupling pin so that the collar and said stem nut are locked together for rotation.

9. A drive assembly for coupling a valve stem to a motor, comprising:
   a collar rotatably coupled to the drive motor;
   a stem nut releasably and drivably engaged with the collar and threaded for threadably receiving a portion of a valve stem, the collar coaxially receiving the stem nut therein and the stem nut being rotatably within the collar and having an engageable portion exteriorly positioned for access from the exterior of the drive assembly for direct rotation thereof; and
   a coupling pin insertable between the collar and the stem nut, when the pin is inserted the collar and the stem nut are locked together for operation of the valve stem by the motor and when the pin is not inserted the collar and the stem nut rotate independently, the pin being accessible from the exterior of the drive assembly.

10. The drive assembly of claim 9 wherein the collar and stem nut have corresponding grooves formed in adjacent surfaces thereof for receiving the coupling pin so that the collar and stem nut are locked together for rotation.

11. A drive assembly for coupling a valve stem to a motor, comprising:
   a drive motor;
   a collar rotatably coupled to the drive motor;
   a stem nut releasably and drivably engaged with the collar and having means for engaging a stem of a valve to actuate the valve in response to rotation fo the stem nut, the stem nut having a manually engageable portion exteriorly positioned for access from the exterior of the drive assembly for direct rotation of the stem nut; and
   a removable locking member releasably locking the stem nut and the collar together in fixed relative relation for rotation, the locking member being movable relative to each of the stem nut and collar for selectively interconnecting the stem nut and collar and being accessible from the exterior of the drive assembly for rapid and easy release of the collar from driving engagement with the stem nut by movement of the locking member to remove the locking member without further disassembly of the drive assembly to allow manual rotation of the stem nut to drive the valve stem independent of the drive motor.

12. The drive assembly of claim 11 wherein the collar and stem nut have corresponding grooves formed in adjacent surfaces thereof for receiving the locking member so that the collar and stem nut are locked together for rotation.

13. The drive assembly of claim 12 wherein the locing member is a coupling pin.

14. An apparatus for axially displacing a valve stem or the like alternately either manually or with the aid of a power drive means, which comprises:
   a drive motor;
   a substantially axially stationary collar rotatably coupled to the drive motor;
   a valve stem positioned with a first portion thereof extending inside the interior of the collar, the first portion of the valve stem being sized so that it is spaced apart from the interior walls of the collar;
   a stem nut rotatably mounted within the collar between the collar and the valve stem, the stem nut including means for threadably engaging the valve stem such that rotation of the stem nut with the collar will produce axial movement of the valve stem, the stem nut including means for manually rotating the stem nut within the collar, the rotation means having a manually turnable member portion exteriorly positioned for access from the exterior of the apparatus for manual rotation of the stem nut; and
   at least one coupling member removable from the exterior of the apparatus for releasably engaging and locking theretogether the stem nut and the collar in fixed relative relation for rotation, thereby enabling the drive motor to rotate the stem nut to produce axial displacement of the valve stem when the at least one coupling member is in place, yet allowing the valve stem to be manually displaced in the event of failure of the drive motor by removing the at least one coupling member and manually rotating the stem nut, the at least one coupling member being manually movable relative to each of the stem nut and collar for removal thereof.

15. The apparatus of claim 14 wherein the maually turnable member portion comprises an end flange accessible at one end of the collar, the end flange adapted to be engaged by a suitable hand tool for rotation of the stem nut.

16. The apparatus of claim 14 wherein the collar and stem nut have corresponding grooves formed in adjacent surfaces thereof for removably receiving at least one coupling member so that the collar and stem nut are locked together for rotation.

17. The apparatus of claim 16 wherein the at least one coupling member is a coupling pin.

* * * * *